United States Patent
Ogawa et al.

(10) Patent No.: US 6,295,893 B1
(45) Date of Patent: Oct. 2, 2001

(54) HOLLOW CAM SHAFT

(75) Inventors: Eiji Ogawa; Shunsuke Takeguchi, both of Tochigi-ken (JP)

(73) Assignee: Nippon Piston Ring Co., Ltd. (JP)

( * ) Notice: Subject to any disclaimer, the term of this patent is extended or adjusted under 35 U.S.C. 154(b) by 0 days.

(21) Appl. No.: 09/492,129

(22) Filed: Jan. 27, 2000

(30) Foreign Application Priority Data

Jan. 27, 1999 (JP) .................................................. 11-018832

(51) Int. Cl.$^7$ .................................................. B21D 53/84
(52) U.S. Cl. ........................ 74/567; 123/90.6; 29/888.1; 251/251
(58) Field of Search ............................. 74/567; 123/90.6; 251/251; 29/888.1; 403/270, 271, 272

(56) References Cited

U.S. PATENT DOCUMENTS 4,211,589 * 7/1980 Fisher et al. ........................ 156/73.5

* cited by examiner

Primary Examiner—David A. Bucci
Assistant Examiner—Chong H. Kim
(74) Attorney, Agent, or Firm—Parkhurst & Wendel, L.L.P.

(57) ABSTRACT

A hollow cam shaft is composed of a hollow shaft having an inner hollow portion and an end piece which is pressure-welded to at least one end of the hollow shaft. The end piece comprises an end member which is pressure-welded to the one end of the hollow shaft and an enclosure member extending from the end member in an axial direction thereof so as to be inserted into the inner hollow portion of the hollow shaft at a time of pressure welding to define an enclosure space in the inner hollow portion of the hollow shaft. The enclosure member comprises a sealing portion having an outer shape substantially the same as an inner shape of the hollow shaft and a connection portion connecting an end surface of the end member of the end piece and the sealing portion so as to define said enclosure space between the enclosure member and the hollow shaft into which a burr generated at the pressure welding time is enclosed.

7 Claims, 5 Drawing Sheets

INSERTION

FIG. 3B

REVOLUTION

PRIOR ART

HOLLOW CAM SHAFT

BACKGROUND OF THE INVENTION

The present invention relates to a hollow cam shaft (camshaft) having a structure in which an end piece is pressure-welded to a hollow shaft particularly capable of enclosing burr or flush generated at a time when the end piece is pressure-welded to the hollow shaft. Further, in the above meaning, the hollow cam shaft of the present invention may be referred to as end piece pressure welded type hollow cam shaft or hollow cam shaft having an end piece pressure-welded structure.

A cam shaft constituting one element of an engine of an automobile, for example, is usually manufactured by assembling and fixing a hollow shaft and various pieces such as cam piece, journal piece, end piece and the like. In the prior art, the Japanese Patent Laid-open Publication No. SHO 54-86456 discloses a method of fixing an end piece to a hollow shaft by means of brazing and soldering, and on the other hand, the Japanese Patent Laid-open Publication No. HEI 7-167152 discloses a method of fixing an end piece to a hollow shaft by fitting, under pressure, i.e. press-fitting, the end piece into the hollow shaft. Furthermore, a fixing method utilizing a welding process is also known.

However, the method by means of brazing or welding requires consumable goods or materials such as filler material (metal), flux, sealed gas or other, and furthermore, in the press-fitting method, it is necessary to preliminarily carry out a machine working to the end piece and the hollow shaft with high performance. Accordingly, in these conventional methods, there are provided problems of simplifying processes or steps, reducing cost and so on.

Taking the above matters into consideration, the inventors of the subject application attempted to fix both the end piece and the hollow shaft by means of friction welding, which has been well known in the prior art. The friction welding method is a method of abutting materials to be joined, applying a pressure thereto, performing a mechanical relative movement at their mating surfaces and then joining these materials by a friction heat generated through the relative movement thereof. The joining method by means of such friction welding does not require a consumable goods or products such as filler material used in the blazing and soldering method mentioned above. Furthermore, this joining method does not preliminarily require a precise mechanical (machine) working of the end piece and the hollow shaft. Accordingly, this joining method has advantages in comparison with the other methods mentioned above.

Figure 6:
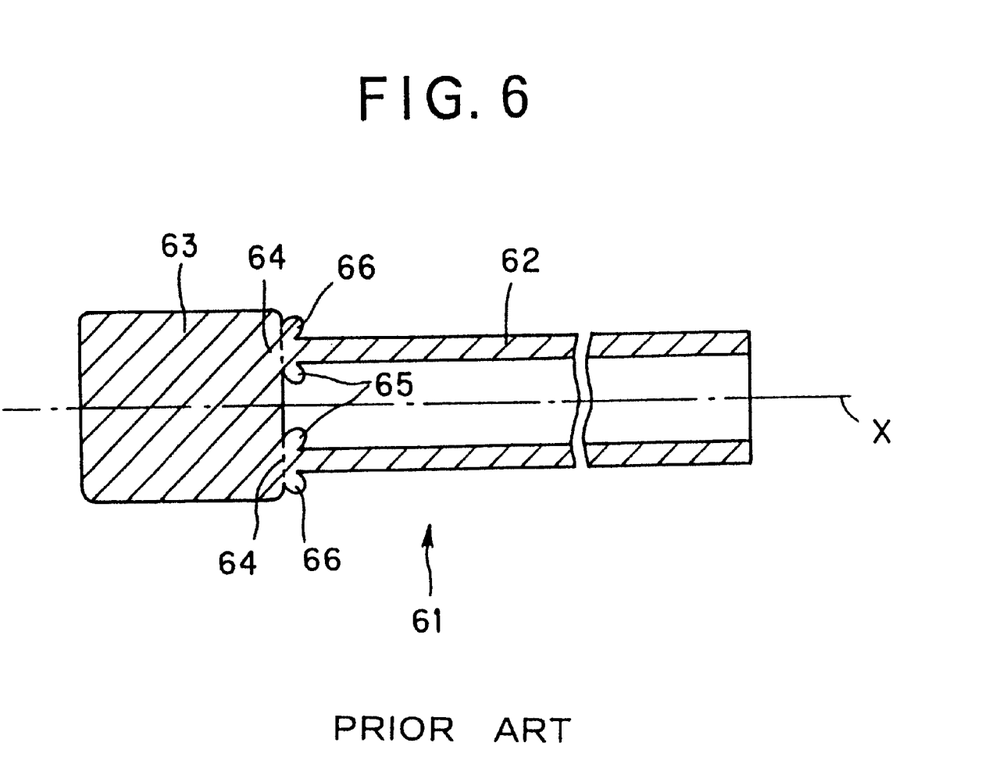
FIG. 6 is a sectional view of one example of a conventional hollow cam shaft having end piece welded structure.

FIG. 6 is a sectional view showing one example of an end piece pressure-welding type hollow cam shaft 61 which was manufactured by the inventors through the frictional welding.

With reference to FIG. 6, an end piece 63 is fixed to a hollow shaft 62 by means of the friction welding, burrs 65 and 66 are formed to both inner and outer peripheral surface sides of a pressure-welding (welded) portion 64. Although the outer burr 66 formed to the outer peripheral surface side can be easily removed through a simple mechanical working, it is very difficult to remove the inner burr 65 formed to the inner peripheral surface side. When the hollow cam shaft 61 with the inner burr 65 being not removed, particularly, in a case where an inner hollow portion inside the cam shaft is utilized as an oil passage, there is a fear of the falling of the burr 65 and the invading of foreign materials into an inside of an engine, which may give a significant damage to a valve moving mechanism and, hence, to the whole structure of the engine.

SUMMARY OF THE INVENTION

An object of the present invention is to substantially eliminate defects or drawbacks encountered in the prior art mentioned above and to provide a hollow cam shaft capable of enclosing a burr formed at a time of joining an end piece and a hollow shaft through a friction welding.

This and other objects can be achieved according to the present invention by providing a hollow cam shaft which comprises a hollow shaft having an inner hollow portion and an end piece which is pressure-welded to at least one end of the hollow shaft, the end piece comprising an end member which is pressure-welded to the one end of the hollow shaft and an enclosure member extending from the end member in an axial direction thereof so as to be inserted into the inner hollow portion of the hollow shaft at a time of pressure welding to define an enclosure space in the inner hollow portion of the hollow shaft, and the enclosure member being composed of a sealing portion having an outer shape which is substantially the same as an inner shape of the hollow shaft and a connection portion connecting an end surface of the end member of the end piece and the sealing portion so as to define the enclosure space between the enclosure member and the hollow shaft into which a burr generated at the pressure welding time is enclosed.

In a preferred embodiment of the above aspect of the present invention, the end piece is formed with an escape groove for escaping the burr formed at the pressure welding time. The escape groove is formed to an inner peripheral side of the pressure welding portion of the end member of the end piece. The escape groove may be formed to an outer peripheral portion of the connection portion on the side of the end member.

The end member and the enclosure member of the end piece are integrally formed from one solid member or independently formed and then joined together.

The pressure welding is preferably a friction welding performed by means of friction heat generated by rotating either one of the end piece and the hollow shaft with respect to the other one thereof.

According to the hollow cam shaft having an end piece pressure welded structure mentioned above, since the burr generated inside the hollow shaft in the pressure-welding process can be enclosed in the enclosure space defined by the enclosure member composed of the sealing portion and the connection portion, it is not necessary to specifically carry out the burr removing process. Particularly, in the case of the hollow cam shaft utilizing its outer periphery as an oil passage, it is possible to prevent the fallen burr from invading into the engine, so that it is possible to prevent the valve moving mechanism of an engine or, moreover, the entire structure of the engine itself from being damaged by the burr. Furthermore, the sealing portion has the outer shape substantially equal to the inner shape of the hollow shaft, so that when the enclosure member is inserted into the hollow shaft, this sealing portion will serve as guide portion thereby to easily guide the hollow shaft to the predetermined pressure welding portion of the end member. Still furthermore, it is possible to properly form the enclosure space having a size and/or shape in conformity with the generation amount and generation mode of the inner burr generated at the friction welding time by suitably adjusting the outer diameter and axial length of the connection portion, thus the inner burr being completely enclosed in the enclosure space. Therefore, according to the present invention, the hollow cam shaft can be easily manufactured by the joining method utilizing the pressure welding process, and hence, the manufacturing processes can be made simple and easy and the manufacturing cost can be also reduced.

According to the preferred embodiment of the present invention, in the structure that the burr escape groove is formed to the end piece, the burr generated inside the hollow shaft at the friction welding time can be smoothly discharged by forming the escape groove. As a result, the clean surface of the pressure welded portion suitable for generating the heat in the friction welding process and joining the surfaces to be welded can be ensured. Furthermore, the smooth discharging of the burr can achieve such effects as that a force for restricting the burr generation is not applied to another portion, that the generation of any deformation or distortion can be also restricted and that the falling of the burr can be itself restricted.

Furthermore, the integral structure of the end member and the enclosure member of the end piece can distribute to the easy manufacturing process of the hollow cam shaft with an improved workability.

The nature and further characteristic features of the present invention will be made more clear from the following descriptions made with reference to the accompanying drawings.

DESCRIPTION OF THE PREFERRED EMBODIMENT

A preferred embodiment of an end piece pressure-welded type hollow cam shaft according to the present invention will be described hereunder with reference to the accompanying drawings.

Figure 1:
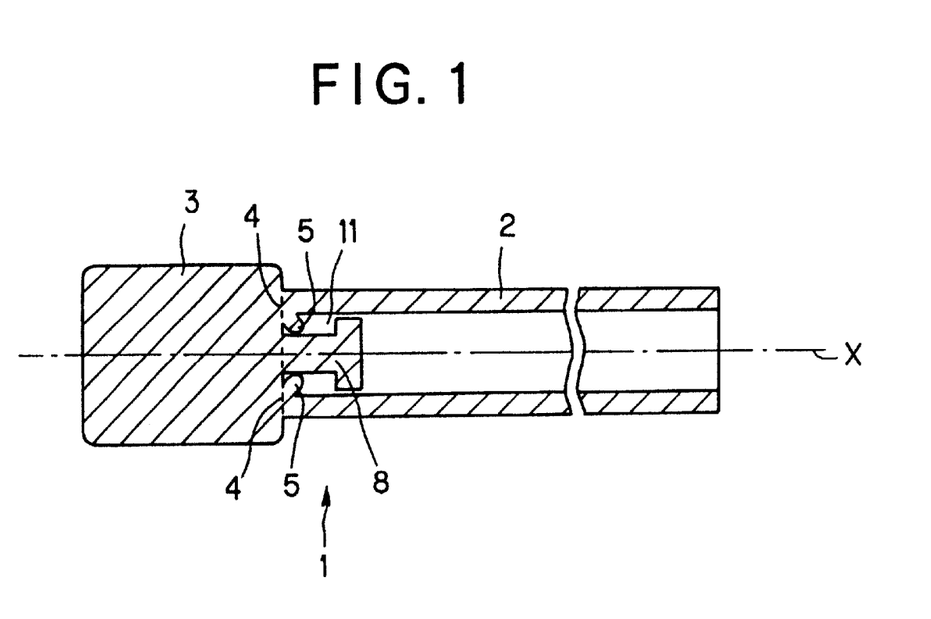
FIG. 1 is a sectional view of an end piece pressure welded type hollow cam shaft according to one embodiment of the present invention.

With reference to FIG. 1, a hollow cam shaft 1 is composed of hollow shaft 2 and an end piece 3 which is joined to at least one end portion of the hollow shaft 2 through a friction welding. At the friction welding a burr 5 is formed to the inside portion of a pressure-welded (welding) portion 4, and the inner burr 5 is enclosed in an enclosure space 11 defined by an enclosing member 8, constituting one portion of the end piece 3, and the hollow shaft 2. According to the present invention, the inner burr 5 formed at the friction welding process, which is difficult to be removed, can be enclosed in the enclosure space 11, so that it is not necessary to carry out the inner burr removing process.

Figure 2A:
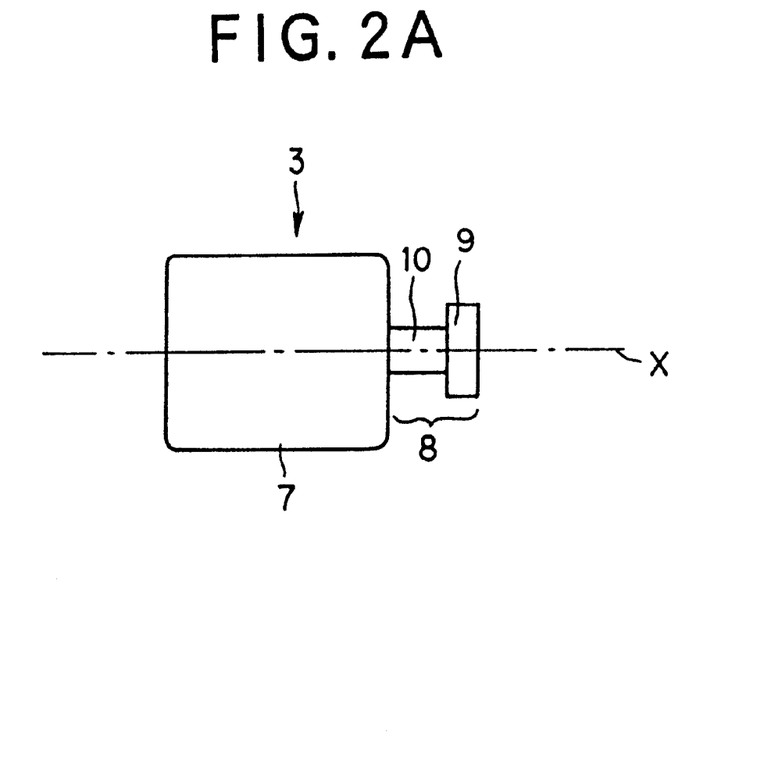
FIG. 2A is an illustration of one example of an end piece.
Figure 2B:
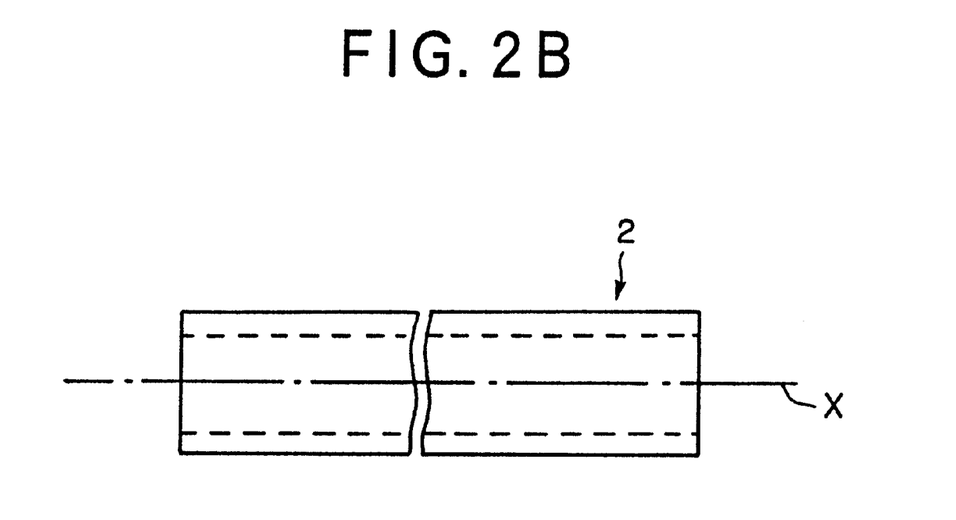
FIG. 2B is an illustration of one example of a hollow shaft to which the end piece of FIG. 2A is welded.

FIGS. 2A and 2B are views showing the end piece 3 and the hollow shaft 2, respectively, constituting the end piece pressure welded type hollow cam shaft of the present invention.

As shown in FIG. 2A, the end piece 3 comprises an end member 7 which is welded under pressure to the hollow shaft 2 and the enclosure member 8 which is inserted into the hollow shaft 2 at the pressure welding time thereby to enclose the inner burr 5 generated inside the hollow shaft 2, the end member 7 and the enclosure member 8 having different diameters and having a common imaginary axis (axial line) X. The enclosure member 8 is formed to the end member 7 so as to project outward in the direction of the axis X from substantially a central portion of the end surface of the end member 7. The enclosure member 7 is composed of a sealing (enclosing) portion 9 having an outer shape corresponding substantially to an inner shape of the hollow shaft 2 and a connection portion 10 projecting outward from the end surface of the end member 7 and connecting the sealing portion 9 and the end member 7. The connection portion 10 has an outer diameter smaller than that of the sealing portion 9, and the enclosure space 11 (FIG. 1) is defined between the connection portion 10 and the inner peripheral surface of the hollow shaft 2 when assembled. A material of the end piece 3 is not specifically limited and any material to which the friction welding, which will be explained hereinlater, can be preferably performed is usable, and for example, a known steel (carbon steel) for machine structure use will be utilized.

Incidentally, as shown in FIG. 2B, the hollow shaft 2 has a hollow pipe shape to which a cam piece or journal piece, not shown, is fixed to at least one end surface of the hollow shaft 2. Since the hollow cam shaft 2 of the present invention is mainly used as an oil-circulation type cam shaft (cam shaft having an oil circulation structure), the hollow cam shaft 2 is used as an oil passage, i.e. lubrication oil supply passage, and accordingly, a working for forming such lubrication oil supply passage is effected to the hollow shaft 2. As mentioned above with respect to the end piece 3, a material of the hollow shaft 2 is also not specifically limited and any material to which the friction welding can be preferably performed is usable, and for example, a known steel (carbon steel) for machine structure use will be utilized.

The hollow shaft 2 may be formed with a swelled portion, not shown, for pressure-welding the cam piece or journal piece. The method of pressure-welding the cam piece or journal piece is not specifically limited itself and a known method will be applied.

Figure 3A:
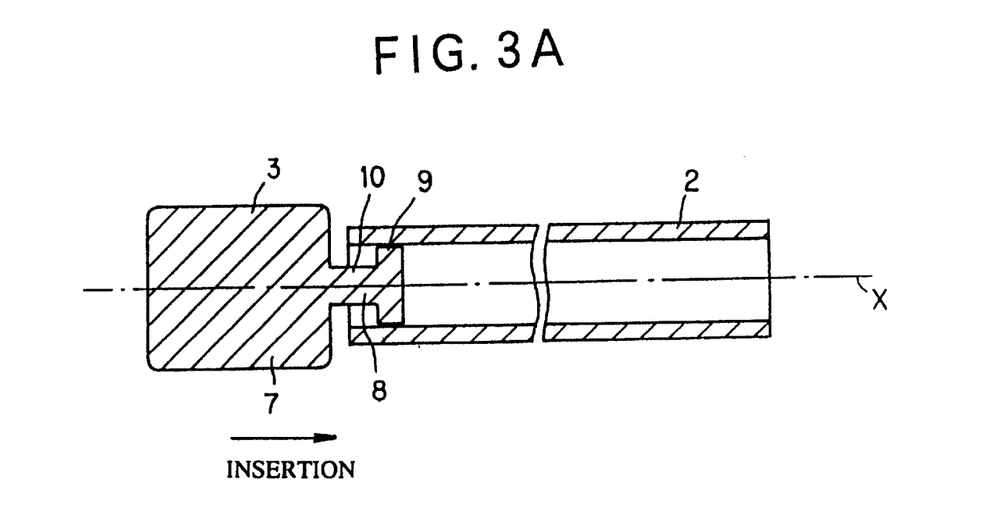
FIGS. 3A and 3B are views explaining one method of manufacturing the hollow cam shaft.
Figure 3B:
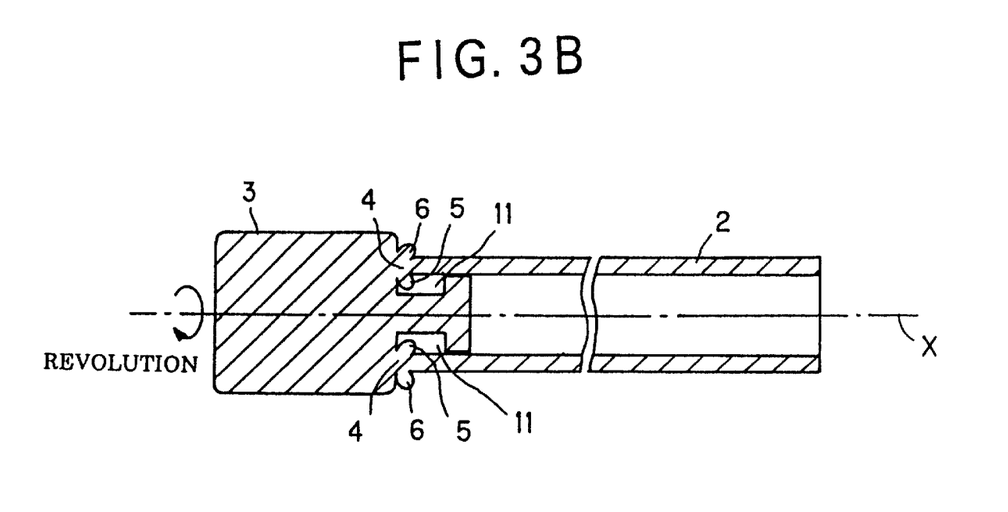

With reference to FIGS. 3A and 3B, a method of manufacturing the end piece pressure-welding type hollow cam shaft will be described hereunder, in which the hollow cam shaft 1 is manufactured by the friction welding method which is well known in the conventional technology as one of joining methods of metal members.

First, with reference to FIG. 3A, the hollow shaft 2 is fitted to the enclosure member 8 of the end piece by inserting the enclosure member 8 of the end piece 3 into the hollow shaft 2 so that the fitted end portion of the hollow shaft 2 abuts against the predetermined pressure-welding portion 4 formed to the end surface of the end member 7 of the end piece 3. In this operation, since the sealing portion 9 is formed so as to have an outer diameter substantially the same as an inner diameter of the hollow shaft 2, the sealing portion constituting a portion of the enclosure member 8 serves as guide member for guiding the insertion of the enclosure member 8 into the hollow shaft 2 thereby to easily guide the hollow shaft 2 to the predetermined pressure-welding portion 4.

In the next step, the hollow shaft 2 abutting against the pressure-welding portion 4 of the end member 7 is pressed against that portion 4 in the direction towards the end piece 3. Then, under the pressed state, as shown in FIG. 3B, the end piece 3 is mechanically rotated, and of course, it is possible to rotate the hollow shaft 2 in place of the end piece 3. At this time, a friction heat is generated to the contacting surface of the pressure-welding portion 4 by this rotation. This friction heat is utilized as a heating source and the friction welding is performed by this friction heat and an upset pressure applied at a time when the rotation is stopped. At this time, the inner and outer burrs 5 and 6 are generated or formed to the inner and outer peripheral sides of the pressure-welded portion 4 by an upset margin (welding margin) to this upset pressure.

The friction welding has such advantageous effects or functions as: (i) since the pressure welding portion 4 to be joined constitutes a heat generating surface, good energy concentration for performing the pressure welding can be achieved and hence for effectively performing the joining process; (ii) since the heating area is small and the rotation can be mechanically carried out, there is less causing of deformation, thus providing a high dimensional precision; (iii) since the pressure welding can be performed at a solid-phase state of the material to be joined, it is possible to join different kinds of materials; (iv) since the pressure welding can be performed by a machine or the like, it is easy to set the welding conditions and the welding process can be carried out with high performance; and (v) it is not necessary to use any filler material (metal), flux, shield gas or the like.

In order to carry out such friction welding in a good condition, it is necessary for the hollow shaft 2 and the end piece 3 to be formed from materials or with structures having strengths which bear a high rotation motion and also bear a large torque generated at the initial stage of the friction welding process and the rotation stopping time of the end piece or hollow shaft. Further, the conditions of the end surfaces of the hollow shaft 2 and the end piece 3 to be pressure welded together will be determined by requirements in the conventional technology. That is, surface roughness of the end surfaces to be pressure welded, working process to be carried out to the end surfaces and dirt or the like thereof will be handled or treated by the manner or method which has been carried out in the conventional art.

Further, the outer burr 6 can be easily removed by a removing means provided for the pressure welding machine at the same time of the pressure welding process or in a succeeding process through the machine working. As a result, the hollow cam shaft 1 having the end piece pressure-welded (welding) structure as shown in FIG. 1 can be manufactured.

The thus manufactured hollow cam shaft 1 will be preferably utilized as a cam shaft for an engine of an automobile or the like.

In the process of the friction welding, it is a matter to be optionally selected in accordance with means and/or way for mounting the end piece, cam piece or the like to the hollow shaft whether the hollow shaft 2 is to be selected as rotating side giving the rotation motion or stationary side to be fixed or whether the end piece 3 is to be selected as rotating side giving the rotation motion or stationary side to be fixed.

On the other hand, the inner burr 5 is enclosed in the enclosure space 11, which is, as mentioned hereinbefore, defined between the enclosure member 8 and the hollow shaft 2. Although the size or shape of this enclosure space 11 is not specifically defined, it will be preferably determined in accordance with the generating amount of the inner burr 5 and/or the forming mode or like thereof. Further, in view of the fact that the enclosure member 8 is composed of the sealing portion 9 and the connection portion 10, the size or shape of the enclosure space 11 may be determined by the dimensions or shapes of these portions 9 and 10.

The sealing portion 9 has an outer peripheral shape which is substantially the same as or equal to the inner peripheral shape of the hollow shaft 2 so as not to provide any gap therebetween having a size through which the burr 5 or burr scale passes. For this reason, if the falling of the inner burr 5 is caused, the burr 5 or burr scale can be prevented from invading into the inside of the engine together with the lubrication oil through the gap between the hollow shaft 2 and the sealing portion 9 of the enclosure member 8. Further, as mentioned before, the sealing portion 9 of the enclosure member 8 also serves as guide portion for the hollow shaft 2 at the time when the enclosure member 8 is inserted thereinto.

The size of the formed inner burr 5 differs in accordance with the pressure welding conditions such as welding margin at the time of the friction welding and the like. However, in the friction welding process, since the pressure welding condition, such as welding margin, can be realized at considerably high performance, the burrs formed at the time of the friction welding with the same condition have substantially the same size. Therefore, it is desired to design or set the dimension of the gap between the outer peripheral surface of the sealing portion 9 and the inner peripheral surface of the hollow shaft 2 in consideration of the size of the burr and the burr scale formed at the friction welding time in accordance with the welding margin so as to have a size suitable for smoothly fitting the hollow shaft 2 and smoothly performing the rotating motion of the end piece or hollow shaft. The dimension of this gap is usually about 0.01 to 0.02 mm. Further, it is also desired for the sealing portion 9 to have a thickness capable of easily working the enclosure member 8, causing no deformation at the friction welding time and retaining the fallen inner burr 5 or burr scale, which is usually about 3 to 10 mm.

The connection portion 10 constitutes one part of the enclosure member 8, and the size or shape of the enclosure space 11 is changed by properly adjusting the dimension or shape of the connection portion 10 in accordance with the generation amount and/or mode of the inner burr 5. For example, in a case of much inner burr 5 being generated, the enclosure space 11 may be widened by making small the diameter of the connection portion 10 or making long the length thereof. The generation amount of the inner burr 5 will be changed by the size or thickness of the hollow shaft 2, the pressure welding conditions at the friction welding time (such as applying pressure, welding margin, rotating conditions and the like) and the material or substance of the hollow shaft 2 and the end piece 3. It is preferred to optionally adjust the size or shape of the enclosure space 11 by setting the diameter and length of the connection portion 10 in consideration of the above points or conditions. In a case of the large enclosure space 11, when the inner burr 5 falls, the inner burr 5 collides with the inner surface of the hollow shaft 2, which may generate a noise. On the contrary, in a case of the small enclosure space 11, since the generated burr 5 cannot be completely enclosed, the hollow shaft 2 may be deformed or the welding process may be insufficiently carried out.

Figure 4:
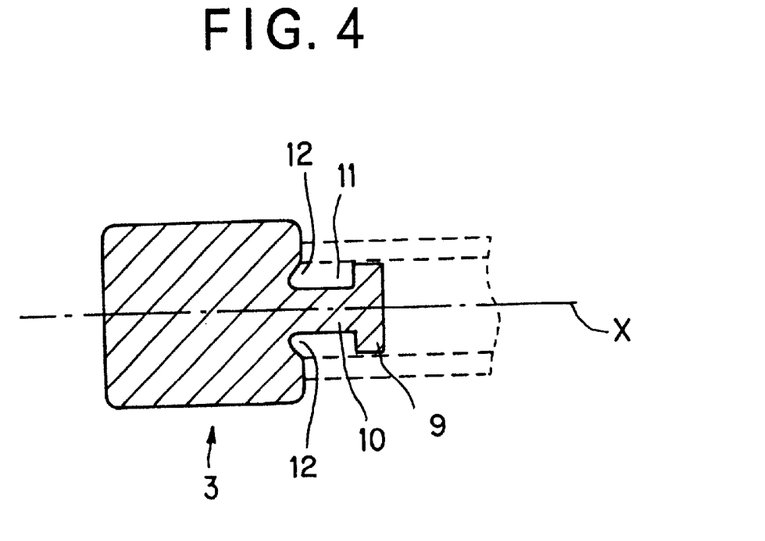
FIG. 4 is a sectional view of the end piece having an end portion having an escape groove formed to the inner peripheral side of a pressure welded portion thereof.
Figure 5:
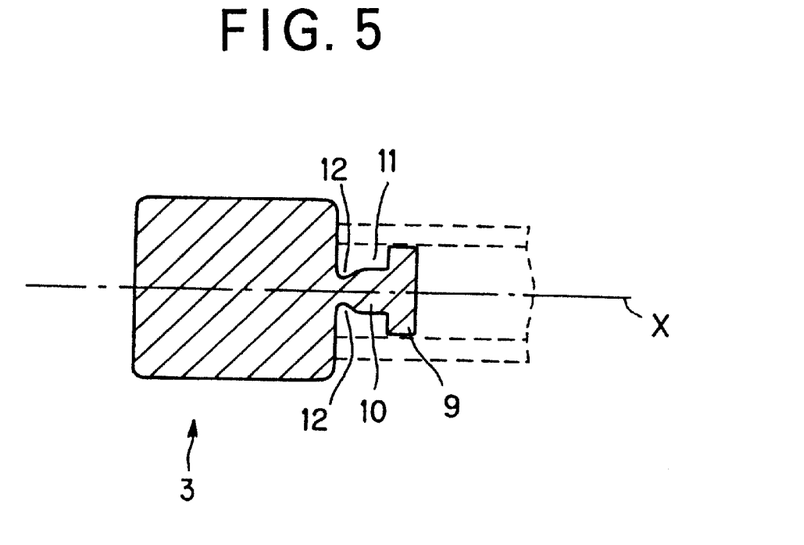
FIG. 5 is a sectional view of the end piece having a connection portion having an escape groove formed to the outer periphery of the end portion side.

Furthermore, it is also desired for the enclosure space 11 to have a shape in conformity with the shape or mode of the generated inner burr 5, and more specifically, an escape groove for the inner burr 5 formed at the pressure welding time may be formed. One example of such escape groove is shown in FIG. 4, in which the escape groove 12 is formed on the inner peripheral side of the pressure welded portion of the end member, and another example of such groove is shown in FIG. 5, in which the escape groove 12 is formed to the outer peripheral portion of the connection portion 10 on the end member side. In the shown examples, although the escape grooves 12 are formed in shape of ring, the shape of the escape groove will not be limited to such ring shape.

The inner burr 5 generated at the friction welding time can be smoothly discharged by forming the escape groove 12 to the end piece 3 such as shown in FIG. 4 or 5. As a result, the clean surface of the pressure welded portion suitable for generating the heat in the friction welding process and joining the surfaces to be welded can be ensured. Furthermore, the smooth discharging of the inner burr 5 can attain such effects as that a force for restricting the burr generation is not applied to another portion, that the generation of any deformation or distortion can be also restricted and that the falling of the inner burr 5 can be itself restricted. Further, in preferred examples, such escape groove may be formed to either one of the inner peripheral side of the pressure welded portion 4 of the end member 7 or the outer peripheral portion of the connection portion 10 on the end member 7 side, or to both the portions mentioned above.

The end piece 3 is usually chipped by cutting a solid round bar or the like member so as to integrally manufacture the end member 7 and the enclosure member 8. The end piece 3 is composed of members having the same axis X but having different diameters, so that the enclosure member 8 and the end member 7 can be integrally formed with high precision by, for example, the mechanical cutting or grinding working. As a result, welding distortion or error in the dimensional performance can be substantially completely prevented from causing at the joining process through, for example, the friction welding, and hence, the manufacturing process can be made easy and the workability can be also improved. Further, the end piece 3 is not limited in its manufacturing process to the grinding working and many other general methods may be utilized.

Furthermore, it may be possible to separately form the end member 7 and the enclosure member 8, which are thereafter joined together through the fitting or soldering working. For example, (I) it may be possible that a ring-shaped member constituting the outer peripheral surface 13 (FIG. 2A) of the sealing portion 9 is machine-worked with high performance, then such ring-shaped member is fitted or joined to the sealing portion 9 of the end piece 3, which has been preliminarily formed, and the gap is formed with high performance between the outer peripheral surface of the ring-shaped member and the inner peripheral surface of the hollow shaft 2; (II) it may be also possible that the sealing portion 9 is machine-worked so as to provide a doughnut shape and, then, the front end of the connection portion 10 of the end piece which has been preliminarily formed is fitted or joined to a hole of such doughnut-shaped sealing portion 9; and (III) it may be further possible that a drilling working is effected to the central portion of the end surface of the end member 7 to form a hole, into which the enclosure member 8 formed preliminarily is fitted or joined to the drilled hole thereby to form the end piece 3.

According to the hollow cam shaft 1 of the present invention, as mentioned above, since the inner burr 5 generated inside the hollow shaft 2, which is hard to be removed, can be enclosed in the enclosure space 11 by the enclosure member 8 composed of the sealing portion 9 and the connection portion 10, it is not necessary to specifically carry out the burr removing process. Particularly, in the case of the hollow cam shaft utilizing its outer periphery as an oil passage, it is possible to prevent the fallen inner burr 5 from invading into the engine, so that it is possible to prevent the valve moving mechanism of the engine or, moreover, the entire structure of the engine itself from being damaged by the inner burr. Furthermore, the enclosure member 8 has the sealing portion 9 having the outer shape substantially equal to the inner shape of the hollow shaft 2, so that when the enclosure member 8 is inserted into the hollow shaft 2, this sealing portion 9 can serve as guide portion thereby to easily guide the hollow shaft 2 to the predetermined pressure welding portion 4. Still furthermore, it is possible to properly form the enclosure space 11 having a size and/or shape in accordance with the generation amount and generation mode of the inner burr 5 generated at the friction welding time by suitably adjusting the outer diameter and axial length of the connection portion, thus the inner burr 5 being completely enclosed in the enclosure space 11. Therefore, according to the present invention, the hollow cam shaft 1 can be easily manufactured by the joining method utilizing the pressure welding process, and hence, the manufacturing processes can be made simple and easy and the manufacturing cost can be reduced.

It is to be noted that the present invention is not limited to the described embodiment and many other changes and modifications may be made without departing from the scopes of the appended claims.

What is claimed is:

1. A hollow cam shaft comprising:

a hollow shaft having an inner hollow portion and an end piece which is pressure-welded to at least one end of the hollow shaft, said end piece comprising an end member which is pressure-welded to the one end of the hollow shaft and an enclosure member extending from the end member in an axial direction thereof so as to be inserted into the inner hollow portion of the hollow shaft at a time of pressure welding to define an enclosure space in the inner hollow portion of the hollow shaft, said enclosure member being composed of a sealing portion having an outer shape which is substantially the same as an inner shape of the hollow shaft and a connection portion connecting an end surface of the end member of the end piece and the sealing portion so as to define said enclosure space between the enclosure member and the hollow shaft into which a burr generated at the pressure welding time is enclosed.

2. A hollow cam shaft according to claim 1, wherein said end piece is formed with an escape groove for escaping the burr formed at the pressure welding time.

3. A hollow cam shaft according to claim 2, said escape groove is formed to an inner peripheral side of the pressure welding portion of the end member of the end piece.

4. A hollow cam shaft according to claim 2, said escape groove is formed to an outer peripheral portion of the connection portion on the side of the end member.

5. A hollow cam shaft according to claim 1, wherein said end member and said enclosure member of the end piece are integrally formed from one solid member.

6. A hollow cam shaft according to claim 1, wherein said end member and said enclosure member of the end piece are independently formed and then joined together.

7. A hollow cam shaft according to claim 1, wherein said pressure welding is a friction welding performed by means of friction heat generated by rotating either one of said end piece and said hollow shaft.

* * * * *